Patented Apr. 20, 1943

2,317,184

UNITED STATES PATENT OFFICE 2,317,184

PHOTOGRAPHIC MATERIAL AND PROCESS OF MANUFACTURING SAME

Paul Dreyfuss, Brussels-Forest, Belgium, assignor, by mesne assignments, to Chromogen, Incorporated, a corporation of Nevada No Drawing. Application October 3, 1939, Serial No. 297,770. In Great Britain October 13, 1938

19 Claims. (Cl. 95—6)

For color photographic purposes it is often desirable to fix soluble dyes in photographic layers by converting the dyes into insoluble compounds. For the fixing of soluble acid dyes, for example, in photographic layers, a number of basic compounds have already been proposed which fix the soluble dyes by the formation of insoluble compounds.

Apart from this fixing of the dyes against diffusion and their bleeding out into water or aqueous treating baths of neutral or acid character, the stability against solutions of alkaline reaction is especially important for color photographic purposes. Many of the known fixing agents yield water-insoluble compounds with soluble acid dyes, but the stability against alkaline solutions of these dye-compounds is generally insufficient.

The present invention relates to new photographic materials and a new process for the manufacture of photographic materials containing photographically adaptable soluble acid compounds, that have been rendered non-diffusing, show no tendency to bleed out into aqueous treating baths and are practically stable to the alkaline solutions usually employed for photographic purposes. The new process consists in the use of polymeric condensation products from formaldehyde, nitrogenous bases or their salts and dicyandiamide as precipitants for the said acid compounds. Such acid compounds may be, for example, soluble acid dyes, soluble acid compounds for a subsequent dye-formation, soluble acid fluorescent compounds and soluble acid catalyst for the local dye-destruction.

In the manufacture of the polymeric condensation products used in the process of the present invention instead of the formaldehyde, its equivalents may be used, such as, for example, polyoxymethylene, methylene iodide, methylal, and mono-chlor-dimethylsulphate. As bases, especially cyclic nitrogen compounds such as aniline, o-toluidine, o-anisidine, and melamine may be used; aliphatic or inorganic nitrogen bases, such as ammonium chloride and methyl-amine may also be employed in the same manner. The condensation may be carried out in one operation with the addition of the components in any order and it may also be carried out in several operations, if desired, with the isolation of intermediate condensation products. Intermediate condensation products already known are, for example, the anhydro-p-amino-benzyl-alcohol which can be obtained according to German Patent No. 96,851 from aniline and one mol formaldehyde, the methylene dianiline which can be obtained as described in "Berichte der Deutschen Chemischen Gesellschaft" vol. 27, page 1805, from aniline and formaldehyde, as described in "Journal of the London Chemical Society" vol. 81, page 283, from aniline and methylene iodide, or, as described in "Berichte der Deutschen Chemischen Gesellschaft" vol. 41, page 1577, from aniline and mono-chlor-dimethyl-sulphate. The anhydro-formaldehyde-aniline which can be obtained from aniline and formaldehyde as described in "Berichte der Deutschen Chemischen Gesellschaft" vol. 17, page 657, or from aniline and polyoxymethylene as described in the "Berichte der Deutschen Chemischen Gesellschaft," vol 18, Referate, page 612, or the condensation products of formaldehyde and organic amines obtainable according to German Patent 308,839.

*Example 1.*—A solution of 8.4 grams dicyandiamide in 17 ccs. of 40% formaldehyde solution is evaporated to dryness. Water is added to the residue and 13 grams of aniline hydrochloride are added gradually to the whole. Thereupon the whole is heated for 5 minutes. 20 ccs. 2n sodium carbonate solution are then added and the liquid is decanted from the condensation product formed. The condensation product is soluble in acids, acetic acid, for instance, and can be obtained in a pure state from the acetic acid solution. Instead of evaporating to dryness the solution containing the intermediate condensation product from dicyandiamide and formaldehyde and thereafter adding water, the aniline hydrochloride may also be added direct to the solution.

*Example 2.*—10.5 grams anhydro-p-aminobenzyl alcohol are dissolved in 8.2 ccs. hydrochloric acid ($d=1.19$) and 50 ccs. water. Thereafter 8.4 grams dicyandiamide are added and the whole is heated at boiling point for 30 minutes. Caustic alkali is added to the solution thus obtained, till no further precipitate is obtained. Thereupon the solution is decanted off from the precipitated base and the latter is washed with water. The base is freed of water as far as possible, and then dissolved in excess glacial acetic acid. Acetone is added to the solution, the acetate of the base being separated out in the form of an oil. The liquid above the oil is decanted off, the oil is repeatedly washed with fresh acetone till the oil solidifies. The product is dried under vacuum and pulverised. It is easily soluble in water.

*Example 3.*—2.1 grams anhydro-p-aminobenzyl-alcohol are dissolved in 20 ccs. of glacial acetic acid. A solution 1.6 grams bromine in glacial acetic acid is added in drops at room temperature. A yellow precipitate is formed, which is filtered off by suction, washed with glacial acetic acid and suspended in water. 15 ccs. of 2n hydrochloric acid are added, the whole brought to boiling, and then 3 grams of dicyandiamide are added. After further boiling for 15 minutes, the undissolved particles are filtered out. After adding 1 gram dicyandiamide, the filtrate is boiled for one hour. Thereupon the base is precipitated with caustic soda, redissolved in acetic acid, again precipitated with caustic soda, filtered, washed and dried. The precipitant thus obtained is employed in aqueous acetic acid solution.

*Example 4.*—3.7 grams of concentrated sulphuric acid are mixed with 4.4 grams of 40% formaldehyde and 10 ccs. of water. 4.6 grams o-toluidine are added to the still warm solution and the whole is heated for five minutes at boiling point. The whole is poured into cold water, neutralized with caustic soda and heated, until the precipitate becomes granular. The precipitate is filtered, washed and dissolved in 25 ccs. 2n hydrochloric acid. An aqueous solution of 5 grams dicyandiamide is added to the solution and the whole heated for one hour at boiling point. The base is precipitated with caustic soda, filtered, washed with water, dried, dissolved in glacial acetic acid and precipitated in form of the acetate by the addition of acetone.

*Example 5.*—Instead of the anhydro-p-aminobenzyl alcohol used in Example 2, there is employed the intermediate condensation product obtainable from 3 mols aniline and 2 mols formaldehyde, and corresponding to the formula

*Example 6.*—Instead of the specific intermediate condensation products employed in Examples 2 and 5 for the further condensation with dicyandiamide, there may be used any intermediate condensation product obtainable by condensing more than 0.5 mol and preferably not more than 1.5 mols of formaldehyde with one mol of aniline.

*Example 7.*—4 ccs. of a 40% aqueous solution of methyl-amine are mixed with 5 ccs. of hydrochloric acid ($d=1.19$) and, after the addition of 5 grams dicyandiamide, the whole is evaporated until fumes are given off. After cooling, the white mass is pulverized and dissolved in 10 ccs. 2n hydrochloric acid and 4 ccs. 36% formaldehyde solution. The whole is heated at boiling point for 10 minutes, the base precipitated with caustic soda, filtered, purified by boiling with water, dissolved in a small amount of glacial acetic acid. From the acetic acid solution, the acetate is precipitated by adding acetone. The acetate is a colorless crystalline substance.

*Example 8.*—21 grams of dicyandiamide are thoroughly mixed with 22.5 grams of trioxymethylene and 25 grams of ammonium chloride. The whole is stirred into 10 ccs. of water and heated for 20 minutes on the oil-bath at 150° C. The gum-like mass is dissolved in water, to which is added caustic soda until no more base is precipitated. The liquid is decanted off, the base washed and purified by repeated dissolving in glacial acetic acid and precipitating with caustic soda. The purified base is dissolved 20 ccs. of glacial acetic acid and 20 ccs. of water, and the acetate of the base is precipitated in form of an oil by the addition of acetone. On prolonged treatment with an excess of acetone, the acetate is obtained in the form of white granules easily soluble in water.

The polymeric condensation products obtained according to Examples 1 to 8 are employed as precipitants for the acid compounds in the process of the present invention in the form of the aqueous solution of their salts, for instance, the acetates, or in the form of the colloidal solution obtained by diluting an alcoholic solution of the free base with distilled water.

If the condensation products described in the examples above are heated in the dry state for some time, for instance at 100° C., considerable amounts of ammonia are developed. The residual compounds which are of unknown constitution are also very good precipitants for acid dyes and they may be employed in the same manner as the original condensation products described above. It is believed that the splitting off of ammonia results in further condensation. The condensation product, for instance, which can be obtained according to Example 2 is believed to include in its formula the following grouping:

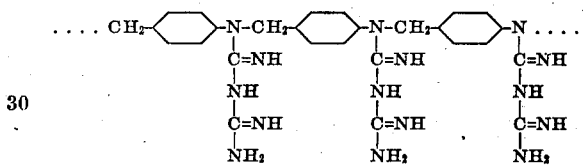

the dots indicating, that this grouping forms part of a larger molecular structure. The splitting off of ammonia in this case might result in a condensation of the side chains.

The condensation products described in the foregoing examples are employed in the process of the present invention as precipitants for fixing soluble acid compounds in light-sensitive silver halide emulsions or in screening layers for photographic purposes. In the preparation of a colored photographic layer, for example, the condensation products may be added already at the same time as the dyes to the emulsion serving for the manufacture of the layers, or layers containing the dyes may be treated with solutions of the condensation products or finally, layers containing the condensation products may be treated with dye solutions. In the same manner the condensation products may also be used for fixing dye-components, including components for the so-called process of color development. The following example illustrates the practising of the process of the present invention in the manufacture of a light-sensitive silver halide emulsion layer dyed red.

*Example 9.*—To 100 ccs. of an ordinary silver-halide gelatin emulsion there are added at 45° C. 28 ccs. of a 3% solution of "Tuchechtbrillantrot 2 B" (Schultz Farbstofftabellen, 7th ed., vol. II, page 221) and 8.4 ccs. of a 10% solution of the precipitant prepared according to Example 2. The colored emulsion thus is coated to form a light-sensitive layer dyed red.

The following example illustrates the practising of the process of the present invention in the manufacture of a light sensitive layer containing a dye component.

*Example 10.*—1 g. N - (p - aminobenzoyl - p - aminobenzoyl) -H-acid is dissolved in 20 ccs. water and 2 ccs. 2n sodium carbonate solution. The solution thus obtained is mixed with 70 ccs. of a 7% aqueous gelatin solution and to the whole 3 ccs. 2n acetic acid are added. Thereby about 96 ccs. of a gelatin solution containing the dye component are obtained, which are mixed with 64 ccs. of a silver halide gelatine emulsion containing 10% gelatin and with 40 ccs. of a 10% aqueous solution of the acetate of anhydro-p-aminobenzyl alcohol.

In order to show the non-diffusing character of a compound formed from the dye-component and the precipitant, the 64 ccs. silver halide emulsion in the above described example are replaced by 64 ccs. of a 10% aqueous gelatin solution. 100 ccs. of the solution thus obtained are cast on to 0.5 sq. m. of a plain gelatin layer. The double-layer is treated for 15 minutes at 18° C. in a solution containing

| | |
|---|---|
| 2n sulfuric acid | ccs__ 12.5 |
| n/10 sodium nitrite solution | ccs__ 10 |
| Water | ccs__ 77.5 |

On this treatment the dye component couples with itself to yield a red dye. After stripping off the colored top layer the degree of diffusion can be estimated by the proportion between the color density of the upper layer and the still nearly colorless lower layer.

Photographic layers containing compounds from acid compounds and the condensation products employed in the process of the present invention are especially useful in multilayer materials for color photographic purposes, because these compounds show no tendency to diffuse into adjacent layers and do not bleed out on treatment with aqueous or alkaline solutions.

In my prior patent application Serial No. 284,102, filed July 12, 1939, I have already claimed the use of certain biguanides and especially of biguanides derived from diphenylmethane derivatives as precipitants for acid dyes in photographic material. I make no claim herein to the employment of the said compounds.

I claim:

1. The process for the manufacture of a colloid layer for photographic purposes, said process comprising the incorporation into said colloid layer of at least one photographically adaptable soluble acid substance and of a precipitant for said acid substance, said precipitant being a polymeric condensation product obtained from a formaldehyde compound, from dicyandiamide and from a compound selected from the group consisting of inorganic nitrogenous bases, aliphatic nitrogenous bases, cyclic nitrogenous bases, and salts of such bases.

2. The process for the manufacture of a colloid layer for photographic purposes, said process comprising the incorporation into said colloid layer of at least one soluble acid dye and of a precipitant for said acid dye, said precipitant being a polymeric condensation product obtained from a formaldehyde compound, from dicyandiamide and from a compound selected from the group consisting of inorganic nitrogenous bases, aliphatic nitrogenous bases, cyclic nitrogenous bases, and salts of such bases.

3. The process for the manufacture of a colloid layer for photographic purposes, said process comprising the incorporation into said colloid layer of at least one soluble acid dye component and of a precipitant for said soluble acid dye component, said precipitant being a polymeric condensation product obtained from a formaldehyde compound, from dicyandiamide and from a compound selected from the group consisting of inorganic nitrogenous bases, aliphatic nitrogenous bases, cyclic nitrogenous bases, and salts of such bases.

4. The process for the manufacture of a colloid layer for photographic purposes, said process comprising the incorporation into said colloid layer of at least one soluble acid catalyst for the local destruction of a dye and of a precipitant for said soluble acid catalyst for the local destruction of a dye, said precipitant being a polymeric condensation product obtained from a formaldehyde compound, from disyandiamide and from a compound selected from the group consisting of inorganic nitrogenous bases, aliphatic nitrogenous bases, cyclic nitrogenous bases, and salts of such bases.

5. The process for the manufacture of a colloid layer for photographic purposes, said process comprising the incorporation into said colloid layer of at least one soluble acid fluorescent compound and of a precipitant for said soluble acid fluorescent compound, said precipitant being a polymeric condensation product obtained from a formaldehyde compound, from dicyandiamide and from a compound selected from the group consisting of inorganic nitrogenous bases, aliphatic nitrogenous bases, cyclic nitrogenous bases, and salts of such bases.

6. The process for the manufacture of a colloid for photographic purposes which comprises incorporating into said colloid at least one photographically adaptable soluble acid substance and a precipitant for said acid substance, said precipitant being a polymeric condensation product obtained from a formeldehyde compound, from dicyandiamide and from a compound selected from the group consisting of inorganic nitrogenous bases, aliphatic amines, cyclic nitrogenous bases, and salts of such bases, said polymeric condensation product being employed in form of a soluble salt.

7. The process for the manufacture of a colloid for photographic purposes which comprises incorporating into said colloid at least one photographically adaptable soluble acid substance and a precipitant for said acid substance, said precipitant being a polymeric condensation product obtained from a formaldehyde compound, from dicyandiamide and from a compound selected from the group consisting of inorganic nitrogenous bases, aliphatic amines, cyclic nitrogenous bases, and salts of such bases, said polymeric condensation product being employed in form of a colloidal solution.

8. A light-sensitive photographic layer comprising a binding agent, a light-sensitive silver salt, a compound formed from a soluble acid dye-component and a polymeric condensation product from a formaldehyde compound, from dicyandiamide and from a compound selected from the group consisting of inorganic nitrogenous bases, aliphatic nitrogenous bases, cyclic nitrogenous bases, and salts of such bases.

9. A colored light-sensitive photographic layer comprising a binding agent, a light-sensitive silver salt and a compound formed from a soluble acid dye and a polymeric condensation product from a formaldehyde compound, from dicyandiamide and from a compound selected from the group consisting of inorganic nitrogenous bases, aliphatic nitrogenous bases, cyclic nitrogenous bases, and salts of such bases.

10. A light-sensitive photographic multilayer material comprising a common support and at least one light-sensitive layer containing a compound uniformly distributed therein formed from a soluble acid dye-component and a condensation product from a formaldehyde compound, from dicyandiamide and from a compound selected from the group consisting of inorganic nitrogenous bases, aliphatic nitrogenous bases, cyclic nitrogenous bases, and salts of such bases.

11. A colored light-sensitive photographic multi-layer material comprising a common support and at least one light-sensitive layer containing a compound uniformly distributed therein formed from a soluble acid dye and a condensation product from a formaldehyde compound, from dicyandiamide and from a compound selected from the group consisting of inorganic nitrogenous bases, aliphatic nitrogenous bases, cyclic nitrogenous bases, and salts of such bases.

12. A colored light-sensitive photographic multi-layer material comprising at least one light-sensitive layer and a filter layer on a common support, said filter layer containing a compound uniformly distributed therein formed from a soluble acid dye and a condensation product from a formaldehyde compound, from dicyandiamide and from a compound selected from the group consisting of inorganic nitrogenous bases, aliphatic nitrogenous bases, cyclic nitrogenous bases, and salts of such bases.

13. A light sensitive silver halide photographic material including a layer comprising a binding agent and a salt compound formed from a photographically adaptable soluble acid substance and a polymeric condensation product from a formaldehyde compound, from dicyandiamide and from a compound selected from the group consisting of inorganic nitrogenous bases, aliphatic nitrogenous bases, cyclic nitrogenous bases and salts of said bases, said compound being uniformly distributed within said binding agent.

14. A light sensitive silver halide photographic material including a layer comprising a binding agent and a salt compound formed from a soluble acid dye and a polymeric condensation product from a formaldehyde compound, from dicyandiamide and from a compound selected from the group consisting of inorganic nitrogenous bases, aliphatic nitrogenous bases, cyclic nitrogenous bases and salts of said bases, said compound being uniformly distributed within said binding agent.

15. A photographic layer comprising a binding agent having distributed therein a substantially water insoluble salt formed by a photographically adaptable soluble acid substance attached through a salt linkage to a basic organic nitrogenous polymeric condensation product selected from the group obtainable by poly-condensation and by chain polymerisation, in the molecule of which the basic group occurs several times periodically.

16. A light-sensitive photographic material comprising a gelatin layer having distributed therein a light-sensitive silver salt and a substantially water insoluble salt formed by a soluble acid dye attached through a salt linkage to a basic organic nitrogenous polymeric condensation product selected from the group obtainable by poly-condensation and by chain polymerisation, in the molecule of which the basic group occurs several times periodically.

17. A light-sensitive photographic material comprising a gelatin layer having distributed therein a light-sensitive silver salt and a substantially water insoluble salt formed by a soluble acid color former attached through a salt linkage to a basic organic nitrogenous polymeric substance selected from the group obtainable by poly-condensation and by chain polymerisation, in the molecule of which the basic group occurs several times periodically, said acid color former being convertible into a dye by reactions which do not convert said basic polymeric substance into a dye.

18. In a process for the production of a colloid layer for photographic purposes, the step of distributing within said colloid a substantially water insoluble salt formed by a photographically adaptable soluble acid substance attached through a salt linkage to a basic organic nitrogenous polymeric condensation product selected from the group obtainable by poly-condensation and by chain polymerisation, in the molecule of which the basic group occurs several times periodically.

19. A process for treating photographic materials comprising a colloid layer having incorporated therein a substantially water insoluble salt formed by a soluble acid color former attached through a salt linkage to a basic organic nitrogenous polymeric condensation product selected from the group obtainable by poly-condensation and by chain polymerisation, in the molecule of which the basic group occurs several times periodically, which comprises treating said colloid layer with a substance which acts to convert said acid color former into a dye without affecting said polymeric condensation product.

PAUL DREYFUSS.